E. M. LANG, Jr.
SOLDER HEMMED CAP.
APPLICATION FILED MAY 8, 1909.

949,582.

Patented Feb. 15, 1910.

Witnesses
Geo. H. Bynce.
Jas. E. Dodge.

Inventor
Edward M. Lang, Jr.
By Wilkinson, Fisher & Witherspoon
Attorneys

UNITED STATES PATENT OFFICE.

EDWARD M. LANG, JR., OF PORTLAND, MAINE.

SOLDER-HEMMED CAP.

949,582. Specification of Letters Patent. Patented Feb. 15, 1910.

Application filed May 8, 1909. Serial No. 494,921.

*To all whom it may concern:*

Be it known that I, EDWARD M. LANG, Jr., a citizen of the United States, residing at Portland, in the county of Cumberland and State of Maine, have invented certain new and useful Improvements in Solder-Hemmed Caps; and I do hereby declare the following to be a full, clear, and exact description of the invention, such as will enable others skilled in the art to which it appertains to make and use the same.

My invention relates to caps or studs used for the closing of metal cans containing hermetically sealed goods, and especially to that class of caps or studs which are hemmed with solder, this application being a specific improvement upon my former patent No. 867,383, dated October 1, 1907.

My invention consists in nurling the entire surface of a hem of solder upon a cap.

Figure 1:
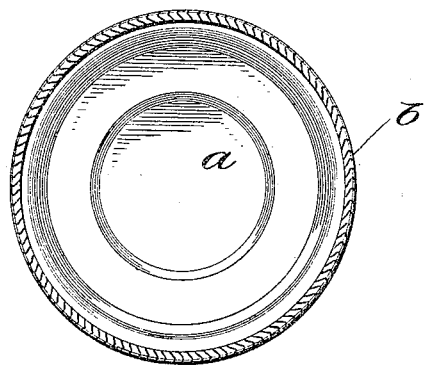
Figure 2:
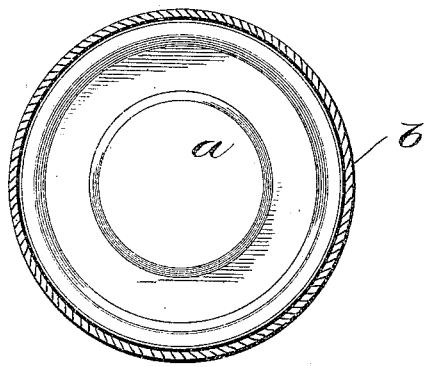
Figure 3:
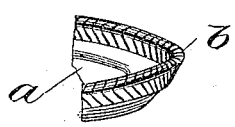
Figure 4:
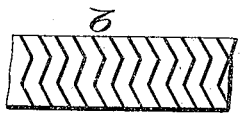

In the accompanying drawings—Figure 1 is a bottom plan view of the cap. Fig. 2 is a top plan view of the same. Fig. 3 is a perspective view on a larger scale of a part of the cap turned bottom upward, showing the hem, and Fig. 4 is a plan view of a part of a hem as flattened out.

*a* represents a can cap of the ordinary shape provided with a hem of solder *b*, which is knurled on both sides as shown in the drawing.

In my previous patent No. 867,383, I showed a hemmed can cap with the hem knurled on the underside, but I have found in practice that better results are obtained by nurling the hem over the entire surface.

The advantages of the improved cap are that during the initial stages of the soldering process, the nurling or roughening of the lower surface of the hem keeps the cap in place on the stud of the can; and also in the fact that the indentations or grooves on the lower surface of the hem permit the gases formed by the heat in the initial stages of the soldering process to readily escape; and furthermore that by nurling the upper surface of the hem the melting of the hem is effected much more quickly, as the hot soldering iron comes in contact first with the elevated portions and there is an opportunity for the gases to escape through the grooves. The knurled surface presents a better and more finished product than the present hemmed caps on the market to-day. Furthermore, this surface has a tendency to hold the small particles of flux in the proper position on the top side of the knurled hem when applied with a brush.

I claim:—

1. A cap having a continuous hem of solder knurled both on the upper and under sides, substantially as described.

2. As a new article of manufacture, a cap the edge of which is provided with a continuous hem of solder, said hem being knurled over its entire outer surface, substantially as described.

In testimony whereof, I affix my signature, in presence of two witnesses.

EDWARD M. LANG, JR.

Witnesses:
K. M. TWIGG,
ALDEN STRONG.